(12) United States Patent
Asano et al.

(10) Patent No.: US 11,499,066 B2
(45) Date of Patent: Nov. 15, 2022

(54) METAL-PARTICLE DISPERSION COMPOSITION AND AQUEOUS COATING COMPOSITION

(71) Applicant: YUKEN INDUSTRY CO., LTD., Aichi (JP)

(72) Inventors: Mari Asano, Aichi (JP); Kiyohiko Watabe, Aichi (JP)

(73) Assignee: YUKEN INDUSTRY CO., LTD., Aichi (JP)

( * ) Notice: Subject to any disclaimer, the term of this patent is extended or adjusted under 35 U.S.C. 154(b) by 0 days.

(21) Appl. No.: 16/754,749

(22) PCT Filed: Oct. 5, 2018

(86) PCT No.: PCT/JP2018/037358
§ 371 (c)(1),
(2) Date: Jul. 28, 2020

(87) PCT Pub. No.: WO2019/073924
PCT Pub. Date: Apr. 18, 2019

(65) Prior Publication Data
US 2020/0407582 A1 Dec. 31, 2020

(30) Foreign Application Priority Data
Oct. 11, 2017 (JP) .............................. JP2017-197778

(51) Int. Cl.
C09D 17/00 (2006.01)
C09D 1/00 (2006.01)

(52) U.S. Cl.
CPC ............. *C09D 17/006* (2013.01); *C09D 1/00* (2013.01); *C09D 17/001* (2013.01)

(58) Field of Classification Search
CPC ...... C09D 17/001; C09D 17/006; C09D 1/00; C09D 5/10; C09D 7/20; C09D 7/63
See application file for complete search history.

(56) References Cited

U.S. PATENT DOCUMENTS 7,083,831 B1 * 8/2006 Koch ...................... C07F 9/095
427/515
2004/0062873 A1 * 4/2004 Jung ........................ C09D 7/48
427/407.1

FOREIGN PATENT DOCUMENTS

| CN | 1777615 | 5/2006 | |
|---|---|---|---|
| CN | 101925457 | 12/2010 | |
| FR | 2866029 | 8/2005 | |
| JP | S6052501 | 3/1985 | |
| JP | S6436664 | 2/1989 | |
| JP | 2004146079 | 5/2004 | |
| JP | 3636203 | 4/2005 | |
| JP | 2005232316 | 9/2005 | |
| JP | 2006028372 A | * 2/2006 | ............... C09D 5/10 |
| JP | 2015048495 | 3/2015 | |
| JP | 2016183306 | 10/2016 | |
| WO | 03093357 | 11/2003 | |
| WO | 2007112870 | 10/2007 | |
| WO | 2009093319 | 7/2009 | |

OTHER PUBLICATIONS

"Search Report of Europe Counterpart Application", dated Jul. 23, 2021, pp. 1-9.
"International Search Report (Form PCT/ISA/210) of PCT/JP2018/037358", dated Dec. 18, 2018, with English translation thereof, pp. 1-4.
"Office Action of Taiwan Counterpart Application", dated Jan. 7, 2020, with English translation thereof, pp. 1-11.
Office Action of China Counterpart Application, with English translation thereof, dated Mar. 25, 2021, pp. 1-10.
Office Action of Japan Counterpart Application, with English translation thereof, dated Oct. 20, 2020, pp. 1-5.
Office Action of Taiwan Counterpart Application, with English translation thereof, dated Sep. 28, 2020, pp. 1-11.
"Office Action of Europe Counterpart Application, Application No. 18866435.3", dated May 2, 2022, p. 1-p. 4.

* cited by examiner

*Primary Examiner* — Shuangyi Abu Ali
(74) *Attorney, Agent, or Firm* — JCIPRNET

(57) ABSTRACT

Provided is a metal-particle dispersion composition as a composition containing dispersed metal particles and being suitable for use in aqueous coating compositions, etc., the metal-particle dispersion composition comprising 10-80 mass % metal particles, 0.01-10 mass % organic titanate compound in a chelate form, 1-40 mass % water, and 2-30 mass % organic solvent having a higher boiling point than water, the amounts being based on the whole composition, wherein the organic titanate compound is an organic compound represented by $Ti(OR)_4$ (the OR groups include at least one chelatable substituent based on triethanolamine) and the organic solvent having a higher boiling point than water is a $C_7$ or lower alcohol compound.

3 Claims, 3 Drawing Sheets

[Table 13]

| Type of solvent | Surface modifier | pH immediately after liquid preparation | Evaluation of stability [day] |
|---|---|---|---|
| EDE | None | 7 | 5 finished |
| | 38S | 4 | 0 finished |
| | 138S | 7 | 1 finished |
| | 238S | 6.5 | ~4 finished |
| | 338X | 5.5 | ~4 finished |
| | TC400 | 8 | ongoing (35~) |
| MPM | None | 7 | 0 finished |
| | 38S | 5.5 | ~4 finished |
| | 138S | 5.5 | ongoing (35~) |
| | 238S | 5.5 | ~4 finished |
| | 338X | 5.5 | ongoing (35~) |
| | TC400 | 8 | ongoing (35~) |

FIG. 1

[Table 14]

| Type of solvent | Surface modifier | pH immediately after liquid preparation | Evaluation of stability [day] |
|---|---|---|---|
| MTEM | None | 7 | 0 finished |
| | 38S | 5.5 | ongoing (35~) |
| | 138S | 5.5 | ~19 finished |
| | 238S | 5.5 | ~19 finished |
| | 338X | 5.5 | ~32 finished |
| | TC400 | 8 | ~5 finished |
| Ethyl lactate | None | 5.5 | 0 finished |
| | 38S | 5.5 | ~4 finished |
| | 138S | 5.5 | 1 finished |
| | 238S | 5.5 | ~5 finished |
| | 338X | 5.5 | ~4 finished |
| | TC400 | — | |
| PM | None | 7 | 0 finished |
| | 38S | 5 | ~5 finished |
| | 138S | 5.5 | ongoing (34~) |
| | 238S | 5.5 | |
| | 338X | 5.5 | |
| | TC400 | 8 | ~5 finished |
| DPM | None | 7 | 0 finished |
| | 38S | 5 | ~3 finished |
| | 138S | 5.5 | ongoing (34~) |
| | 238S | 5.5 | ~3 finished |
| | 338X | 5.5 | ~5 finished |
| | TC400 | 8 | ~5 finished |
| PnB | None | 6.5 | 0 finished |
| | 38S | 5 | ~3 finished |
| | 138S | 5 | ~3 finished |
| | 238S | 5.5 | ~5 finished |
| | 338X | 5 | ~11 finished |
| | TC400 | 8 | ~5 finished |
| PMA | None | 7 | 0 finished |
| | 38S | 5.5 | ~7 finished |
| | 138S | 5.5 | ~5 finished |
| | 238S | 5 | ~7 finished |
| | 338X | 5.5 | ~7 finished |
| | TC400 | 8 | ~18 finished |

[Table 15]

| Type of solvent | Surface modifier | pH immediately after liquid preparation | Evaluation of stability [day] |
|---|---|---|---|
| TPM | None | 7 | ~3 finished |
| TPM | 38S | 5.5 | (ongoing ~34) |
| TPM | 138S | 5.5 | ~18 finished |
| TPM | 238S | 5.5 | ~31 finished |
| TPM | 338X | 5.5 | ~5 finished |
| TPM | TC400 | 8 | ~7 finished |
| DPnB | None | 7 | ~3 finished |
| DPnB | 38S | 4.5 | ~3 finished |
| DPnB | 138S | 5 | ~5 finished |
| DPnB | 238S | 4.5 | ~3 finished |
| DPnB | 338X | 5 | ~3 finished |
| DPnB | TC400 | 8 | ~3 finished |
| PPh | None | 7 | ~3 finished |
| PPh | 38S | 4 | ~7 finished |
| PPh | 138S | 5 | ~3 finished |
| PPh | 238S | 6 | ~7 finished |
| PPh | 338X | 4 | ~3 finished |
| PPh | TC400 | 8 | ~3 finished |
| LG | None | 7 | ~14 finished |
| LG | 38S | 5.5 | ~11 finished |
| LG | 138S | 5.5 | ~11 finished |
| LG | 238S | 5.5 | ~11 finished |
| LG | 338X | 5.5 | (ongoing ~34) |
| LG | TC400 | 8 | ~31 finished |

METAL-PARTICLE DISPERSION COMPOSITION AND AQUEOUS COATING COMPOSITION

CROSS-REFERENCE TO RELATED APPLICATION

This application is a 371 application of the International PCT application serial no. PCT/JP2018/037358, filed on Oct. 5, 2018, which claims the priority benefit of Japan Patent Application No. 2017-197778, filed on Oct. 11, 2017. The entirety of each of the above-mentioned patent applications is hereby incorporated by reference herein and made a part of this specification.

TECHNICAL FIELD

The present invention relates to a composition in which metal particles are dispersed and an aqueous coating composition containing the composition.

BACKGROUND ART

In Patent Literature 1, an aqueous coating composition for rust prevention which contains, based on the entire coating composition, 10 to 60 mass % of metal particles selected from among zinc particles, zinc alloy particles, and aluminum particles, 1 to 15 mass % of an organic titanate compound in a chelate form, 20 to 60 mass % of water, and 2 to 20 mass % of an organic solvent having a higher boiling point than water is described.

CITATION LIST

Patent Literature

[Patent Literature 1]
Japanese Patent No. 3636203

SUMMARY OF INVENTION

Technical Problem

An objective of the present invention is to provide a composition in which metal particles are dispersed and which is suitably used for an aqueous coating composition described in Patent Literature 1. In this specification, "metal particles" refers to a particle material containing a metal and/or an alloy. In addition, an objective of the present invention is to provide a coating composition containing such a composition.

Solution to Problem

The inventors conducted extensive studies in order to address the above problem, and as a result, the following new findings have been obtained.

When a dispersion solution is used (as a specific example, a case of blending with other raw materials in order to produce a predetermined composition is exemplified), metal particles need to be appropriately dispersed in the dispersion solution. However, for the dispersion method, the simplest and most reliable method is a method of stirring a dispersion solution. However, when a dispersion solution is stirred, collision between metal particles that float inside the dispersion solution inevitably occurs. Collision between metal particles may cause defects such as cracking and breaking in the metal particles that have collided.

In such defects, a new surface is generated in metal particles, and the new surface comes into contact with water contained in a liquid component of the dispersion solution and a chemical interaction is caused. When the new surface interacts with water, a reaction in which a metallic material constituting metal particles is dissolved occurs, and hydrogen is generated as a counter reaction of the reaction. Since the solubility of hydrogen in the dispersion solution is generally low, hydrogen generated when the metallic material dissolves is released outside of the dispersion solution.

When the dispersion solution stored inside a sealed container is stirred by shaking the container or the like while a sealed state is maintained, since hydrogen generated in the above process accumulates in a gas part in the sealed container, the pressure in the sealed container increases. When the degree of the increase is large, the container swells and when the degree of the increase is too large, the sealed state of the container cannot be maintained, and the content leaks from the container. In particular, when an amount of hydrogen generated is large, fatal problems such as breakage of the container may occur. Such a phenomenon based on hydrogen generated due to collision between metal particles inside the dispersion solution may occur when a storage period is long even though the dispersion solution is simply stored in the sealed container without actively shaking the container.

The inventors have focused on the above phenomenon, and studied a method of minimizing generation of hydrogen. As a result, the inventors newly found that, when a predetermined organic chelate compound is contained in a dispersion solution, generation of hydrogen can be significantly minimized.

Based on the above findings, the present invention includes the following aspects.
(1) A metal-particle dispersion composition containing, based on the entire composition, 10 to 80 mass % of metal particles, 0.01 to 10 mass % of an organic titanate compound in a chelate form, 1 to 40 mass % of water, and 2 to 30 mass % of an organic solvent having a higher boiling point than water, wherein the organic titanate compound is an organic compound represented by Ti(OR)$_4$ (provided that OR groups include at least one chelatable substituent based on triethanolamine), and wherein the organic solvent having a higher boiling point than water is alcohols having 7 or less carbon atoms.
(2) The metal-particle dispersion composition according to (1), wherein a metallic material contained in the metal particles is composed of a metal or alloy including an element that satisfies either of being able to form at least one of a water-insoluble oxide and a water-insoluble hydroxide and being insoluble in water with a pH of 8 as a base material.
(3) The metal-particle dispersion composition according to (1) or (2), wherein the OR groups include an alkoxy group and do not include a hydroxyl group.
(4) The metal-particle dispersion composition according to (3), wherein the OR groups include an alkoxy group having 4 or less carbon atoms and the chelatable substituent based on triethanolamine.
(5) The metal-particle dispersion composition according to any one of (1) to (4), wherein a proportion of the content of the organic titanate compound with respect to the content of the metal particles is 0.5% or more.

(6) The metal-particle dispersion composition according to any one of (1) to (5), wherein a ratio of the number of carbon atoms $N_C$ to the number of hydroxyl groups $N_{OH}$ in the alcohols is 4 or less.

(7) A metal-particle dispersion composition containing, based on the entire composition, 10 to 80 mass % of metal particles, 0.01 to 10 mass % of an organic titanate compound, 1 to 40 mass % of water, and 2 to 30 mass % of an organic solvent having a higher boiling point than water, wherein the organic titanate compound is an organic compound represented by $Ti(OR)_4$ (provided that OR groups include at least one substituent based on a pyrophosphate ester), and wherein the organic solvent having a higher boiling point than water has 7 to 20 carbon atoms and has a plurality of ether bonds.

(8) The metal-particle dispersion composition according to (7), wherein, in the substituent based on a pyrophosphate ester contained in the organic titanate compound, the number of ester groups bonded to each pyrophosphate is 1 or more and 2 or less.

(9) The metal-particle dispersion composition according to (7) or (8), wherein the number of carbon atoms of each ester group bonded to pyrophosphate is 5 or more.

(10) The metal-particle dispersion composition according to any one of (7) to (9), wherein the number of ether bonds contained in the organic solvent having a higher boiling point than water is 3 or more.

(11) The metal-particle dispersion composition according to any one of (7) to (10), wherein the organic solvent having a higher boiling point than water contains a smaller number of hydroxyl groups than the number of ether bonds.

(12) An aqueous coating composition including the metal-particle dispersion composition according to any one of (1) to (11).

Advantageous Effects of Invention

According to the present invention, there is provided a composition in which metal particles are dispersed and which is suitably used for an aqueous coating composition. In addition, there is provided an aqueous coating composition containing metal particles based on such a composition.

BRIEF DESCRIPTION OF THE DRAWINGS

FIG. 1 illustrates Table 13 of the evaluation results of Example 5.
FIG. 2 illustrates Table 14 of the evaluation results of Example 5.
FIG. 3 illustrates Table 15 of the evaluation results of Example 5.

DESCRIPTION OF EMBODIMENTS

Embodiments of the present invention will be described below.

First Embodiment

A metal-particle dispersion composition according to one embodiment of the present invention contains metal particles, an organic titanate compound in a chelate form, water, and an organic solvent having a higher boiling point than water.

As described above, metal particles are a particle material containing a metal and/or an alloy. The metallic material contained in metal particles is composed of a metal or alloy including an element that satisfies either of being able to form at least one of a water-insoluble oxide and a water-insoluble hydroxide and being insoluble in water with a pH of 8 as a base material. Specific examples of such metallic materials include metals and alloys including one, or two or more elements selected from the group consisting of iron group elements having Fe, Co and Ni as constituent elements, platinum group elements having Pt, In, Rh and the like as constituent elements, noble metals having Au, Ag, and Cu as constituent elements, and Sn, Zn, Al, Ti, Cr, and Mn as a base material. The element serving as a "base material" in this specification is a constituent element in the case of a metal, and means an element having the largest content (mass %) among elements constituting an alloy in the case of an alloy. Examples of an iron-based alloy containing iron as a base material include stainless steel such as SUS304.

The shape of metal particles is not limited. The particles have a shape close to a true sphere or a flat shape. The size thereof is not particularly limited, and is appropriately set according to applications. A particle size (median diameter D50) at 50 volume % in a cumulative distribution from the side of a small particle size measured according to a laser diffraction and scattering method may exceed 100 μm or may be 10 μm or less. When a dispersant is used as a main component for appropriately dispersing metal particles in the metal-particle dispersion composition, if the particle size is excessively large, appropriate dispersion may be difficult. On the other hand, since the metal-particle dispersion composition according to one embodiment of the present invention appropriately disperses metal particles due to stirring when used, the size of metal particles contained in the metal-particle dispersion composition is essentially arbitrary.

Generally, since the specific surface area increases when the particle size (median diameter D50) of metal particles decreases, an area of all of the particles increases. Therefore, for example, when iron particles have a particle size (median diameter) of under 53 μm mesh, since there is a risk of ignition due to natural oxidation, special management is necessary. Even if such iron particles that are easily oxidized are contained as metal particles, in the metal-particle dispersion composition according to one embodiment of the present invention, since an organic titanate compound appropriately protects metal particles as will be described below, it is possible to appropriately minimize the generation of hydrogen.

The content ("content" in this specification means an amount based on the entire composition containing a target object) based on the entire composition of metal particles in the metal-particle dispersion composition according to one embodiment of the present invention is 10 mass % or more and 80 mass % or less. When the content of metal particles is too small, it is difficult to increase the content of metal particles in the composition using the metal-particle dispersion composition as a raw material. When the content of metal particles is excessive, it is difficult to appropriately secure the content of components other than metal particles contained in the metal-particle dispersion composition such as the content of an organic titanate compound to be described below.

The organic titanate compound refers to an organic compound represented by a general formula of $Ti(OR)_4$. Here, OR groups are selected from among a hydroxyl group, a lower alkoxy group, and a chelatable substituent, and may be the same or different from each other, but include at least one chelatable substituent.

The lower alkoxy group refers to an alkoxy group having 6 or less carbon atoms and preferably 4 or less carbon atoms such as methoxy, ethoxy, propoxy, isopropoxy, butoxy, isobutoxy, and tert-butoxy groups. The lower alkoxy group of the organic titanate compound is easily hydrolyzed at room temperature under an aqueous environment to form a hydroxyl group (OH group).

The chelatable substituent refers to a group derived from an organic compound having a chelate-forming ability. Examples of such an organic compound include β-diketones such as acetylacetone, alkyl carbonyl carboxylic acids such as acetoacetic acid and esters thereof, hydroxy acids such as lactic acid, and alkanolamines such as triethanolamine. Specific examples of chelatable substituents include lactate, ammonium lactate, triethanolaminate, acetylacetonate, acetoacetate, and ethyl acetoacetate. Unlike a lower alkoxy group, such a chelatable substituent bonded to an organic titanate compound is unlikely to be hydrolyzed at room temperature under an aqueous environment, but is hydrolyzed when heated to a high temperature.

The chelatable substituents contained in the organic titanate compound of the metal-particle dispersion composition according to one embodiment of the present invention are substituents in which at least one is based on triethanol, that is, triethanolaminate. When the organic titanate compound containing such a chelatable substituent is included, the metal-particle dispersion composition according to one embodiment of the present invention generates specifically a small amount of hydrogen gas.

The organic titanate compound includes triethanolaminate, in other words, it has a chelate form because at least one of OR groups is triethanolaminate. At least one of the other OR groups is a hydroxyl group or a lower alkoxy group, and preferably a lower alkoxy group in order to secure the bond between the organic titanate compound and the surface of metal particles. In the regard, a preferable organic titanate compound is a compound in which two OR groups are lower alkoxy groups that are easily hydrolyzed at room temperature and the remaining two OR groups are chelatable substituents that are not easily hydrolyzed at room temperature. Specific examples of such an organic titanate compound include di-n-butoxytitanium bis(triethanolaminate), and diisopropoxybis(triethanolaminate)titanium.

In the metal-particle dispersion composition according to one embodiment of the present invention, a hydroxyl group of the organic titanate compound and a lower alkoxy group that is easily hydrolyzed at room temperature to form a hydroxyl group undergo a condensation reaction with a hydroxyl group present on the surface of metal particles and thus organic titanate molecules are more firmly bonded to the surface of metal particles according to chemical bonding. As a result, the surface of metal particles is covered with titanate molecules, and direct contact between metal particles and water is minimized. However, in this state, since the surface of metal particles is covered with a triethanolaminate group of the organic titanate compound, the pH of a liquid part in the metal-particle dispersion composition is about 8. In this state, even if defects occur in metal particles due to collision between the metal particles and a new surface is generated, hydroxides and oxides of the metallic material constituting metal particles are quickly generated, and cover the new surface, and thus dissolution of the metallic material can be stopped.

The lower limit value of the amount of the organic titanate compound is set based on the area of metal particles so that the organic titanate compound can appropriately cover the surface of metal particles. When a combination of the organic titanate compound and the organic solvent is appropriately selected, since the solubility of the organic titanate compound can be sufficiently increased, the upper limit is not substantially set. When the content of metal particles is 10 mass % or more and 80 mass % or less as described above, it may be in a range of 0.01 mass % to 10 mass %. A proportion (percentage) of the content of the organic titanate compound with respect to the content of metal particles is preferably 0.5% or more, more preferably 1% or more, and particularly preferably 2% or more.

The metal-particle dispersion composition according to one embodiment of the present invention contains water and an organic solvent having a higher boiling point than water. Water is necessary because the interaction between the organic titanate compound and the surface of metal particles includes hydrolysis of the organic titanate compound. The organic solvent having a higher boiling point than water is necessary in order for an organic titanate compound having a chelatable substituent based on triethanolamine to be dissolved in the metal-particle dispersion composition. In this regard, the organic solvent is alcohols having 7 or less carbon atoms. Specific examples of alcohols having 7 or less carbon atoms include ethanol, n-propanol, 2-propanol, propylene glycol monoethyl ether, diethylene glycol, triethylene glycol, propylene glycol, dipropylene glycol, and dipropylene glycol monoethyl ether. The number of carbon atoms of alcohols is preferably 6 or less, more preferably 5 or less, still more preferably 4 or less, and particularly preferably 3 or less. In addition, the number of carbon atoms of alcohols is preferably 2 or more. The number of hydroxyl groups contained in such alcohols may be one or plural. In addition, alcohols having 4 or less carbon atoms may have an alkoxy group. A ratio ($N_C/N_{OH}$) of the number of carbon atoms $N_C$ to the number of hydroxyl groups $N_{OH}$ in alcohols is preferably 4 or less, more preferably 3.5 or less, and particularly preferably 3 or less.

The content of water and the content of the organic solvent are set so that hydrolysis of the organic titanate compound is appropriately caused and the organic titanate compound is dissolved, and specifically, the content of water is 1 mass % or more and 40 mass % or less, and the content of the organic solvent having a higher boiling point than water is 2 mass % or more and 30 mass % or less.

The pH of the metal-particle dispersion composition according to one embodiment of the present invention is alkaline based on triethanolamine related to the organic titanate compound. The pH of the metal-particle dispersion composition is preferably 7.5 or more, and more preferably 7.5 or more and 8.5 or less. When the pH of the metal-particle dispersion composition satisfies the above condition, hydrogen is unlikely to be generated even if a new surface is generated in metal particles due to, for example, stirring of the metal-particle dispersion composition.

Second Embodiment

A metal-particle dispersion composition according to a second embodiment of the present invention contains metal particles, an organic titanate compound, water, and an organic solvent having a higher boiling point than water, like the metal-particle dispersion composition according to the first embodiment, and has a different type of the organic titanate compound and a different type of the organic solvent having a higher boiling point than water compared to the metal-particle dispersion composition according to the first embodiment. Therefore, in the following description, only the organic titanate compound and the organic solvent having a higher boiling point than water will be described.

The organic titanate compound contained in the metal-particle dispersion composition according to the second embodiment is an organic compound represented by $Ti(OR)_4$, and the OR group contains at least one substituent based on a pyrophosphate ester. The OR group preferably contains two substituents based on a pyrophosphate ester and more preferably three substituents.

Since the organic titanate compound has a substituent based on a pyrophosphate ester, the metal-particle dispersion composition tends to be weakly acidic (4 or more and less than 7). It is considered that, in the weakly acidic environment, oxygen (O) contained in pyrophosphate interacts with metal particles, and in some cases, when metal elements constituting metal particles and a substance such as a phosphate are formed, generation of hydrogen according to the reaction between metal particles and water is minimized in the metal-particle dispersion composition.

A pyrophosphate is a tetravalent acid, and one of which bonds to Ti, and a maximum of three ester bonds can be formed. When the number of ester bonds in the organic titanate compound is larger, the interaction of the organic titanate compound with the organic solvent can be improved. On the other hand, when the number of esters bonded to pyrophosphate of the organic titanate compound is too large, oxygen (O) contained in pyrophosphate is unlikely to interact with metal particles. In the substituent based on a pyrophosphate ester contained in the organic titanate compound according to one embodiment of the present invention, the number of ester groups bonded to each pyrophosphate is preferably 1 or more and 2 or less.

When an organic group is not ester-bonded to P bonded to Ti via O between two Ps constituting pyrophosphate, and a hydroxyl group is bonded thereto, this is preferable because a substituent based on a pyrophosphate ester is easily bonded to Ti.

The number of carbon atoms of each ester group bonded to pyrophosphate is preferably 5 or more and more preferably 7 or more in order to improve the interaction with the organic solvent. In order to minimize the influence of steric hindrance, the number of carbon atoms of each ester group bonded to pyrophosphate is preferably 15 or less, and more preferably 12 or less.

The organic solvent having a higher boiling point than water contained in the metal-particle dispersion composition according to the second embodiment has 7 to 20 carbon atoms and has a plurality of ether bonds. When the number of carbon atoms is 7 or more, it is easy to set a boiling point of the organic solvent to be higher than that of water. When the number of carbon atoms is 20 or less, the interaction between water or an organic solvent and the organic titanate compound easily occurs.

The number of ether bonds contained in the organic solvent having a higher boiling point than water is preferably 3 or more in order to improve miscibility of the organic solvent with water. Although the upper limit of the number of ether bonds contained in the organic solvent having a higher boiling point than water is not set, since the upper limit of the number of carbon atoms of the organic solvent having a higher boiling point than water is 20, the number of ether bonds contained in the organic solvent having a higher boiling point than water is preferably 10 or less in order to secure stability of the structure and secure ease of production.

While the organic solvent having a higher boiling point than water may contain a hydroxyl group in order to improve miscibility of the organic solvent with water, the number of hydroxyl groups is preferably smaller than the number of ether bonds. When the number of hydroxyl groups is limited, it is possible to reduce a possibility of active hydrogen contained in the hydroxyl group acting to reduce the stability of the metal-particle dispersion composition. In this regard, when the organic solvent having a higher boiling point than water contains a hydroxyl group, the number of hydroxyl groups is preferably 1.

Even if the metal-particle dispersion composition according to some embodiments of the present invention described above are stored for a long time, since hydrogen is unlikely to be generated, they can be suitably used as a raw material of a composition having a relatively low content of metal particles than the metal-particle dispersion composition. As such a composition, an aqueous coating composition described in Patent Literature 1 may be exemplified.

The embodiments described above are described to facilitate the understanding of the present invention, and are not described to limit the present invention. Therefore, components disclosed in the above embodiments are intended to include all design changes and equivalents in the technical scope of the present invention.

EXAMPLES

While the effects of the present invention have been described below with reference to examples, the present invention is not limited thereto.

Example 1

A metal-particle dispersion composition containing 3 g of water, 2 g of any organic solvent shown in Table 1, 1 g of any organic titanate compound shown in Table 2, and 3 g of any metal particles shown in Table 3 was prepared (Table 4).

TABLE 1

| Number | Product name, etc. | Chemical name | Production |
| --- | --- | --- | --- |
| OS-1 | Hisolve EDM | Diethylene glycol ethyl methyl ether | TOHO Chemical Industry Co., Ltd. |
| OS-2 | Hisolve MTEM | Tetraethylene glycol dimethyl ether | |
| OS-3 | PrG | Propylene glycol | AGC Inc. |
| OS-4 | DPrG | Dipropylene glycol | |
| OS-5 | PM | Propylene glycol monoethyl ether | Dow Chemical Japan |
| OS-6 | DPM | DiPropylene glycol monoethyl ether | Dow Chemical Japan |
| OS-7 | | Ethanol | Wako Pure Chemical Industries, Ltd. |
| OS-8 | | n-Propanol | Wako Pure Chemical Industries, Ltd. |
| OS-9 | | 2-Propanol | Wako Pure Chemical Industries, Ltd. |
| OS-10 | | 1-Butanol | Wako Pure Chemical Industries, Ltd. |
| OS-11 | | n-Pentanol | Wako Pure Chemical Industries, Ltd. |
| OS-12 | | 2-Pentanol | Wako Pure Chemical Industries, Ltd. |

TABLE 2

| Number | Product name, etc. | Chemical name | Production |
|---|---|---|---|
| OTC-1 | Orgatix TA-10 | Titanium tetraisopropoxide | Matsumoto Fine Chemical Co., Ltd. |
| OTC-2 | Orgatix TA-22 | Butyl titanate dimer | |
| OTC-3 | Orgatix TA-25 | Tetra normal butyl titanate | |
| OTC-4 | Orgatix TC-100 | Titanium acetylacetonate | |
| OTC-5 | Orgatix TC-300 | Titanium lactate ammonium salt | |
| OTC-6 | Orgatix TC-315 | Titanium lactate | |
| OTC-7 | Orgatix TC-400 | Titanium triethanol aminate | |
| OTC-8 | Orgatix TC-510 | Titanium aminoethyl aminoethanolate | |
| OTC-9 | Orgatix TC-750 | Titanium ethyl acetoacetate | |
| OTC-10 | TAT | Di-n-butoxybis(triethanol aminate)titanium | Nippon Soda Co., Ltd. |
| OTC-11 | B10 | Tetrabutoxy titanium oligomer | |
| OTC-12 | TOG | Titanium-i-propoxyoctylene glycolate | |

TABLE 3

| Number | Product name, etc. | Composition, shape (median diameter D50) | Production |
|---|---|---|---|
| MP-1 | Zinc Flake GTT | Zn flake (D50 = 13 μm, under 45 μm mesh) | ECKART GmbH |
| MP-2 | Cr fine powder 10 μm | Cr (10 μm) | Kojundo Chemical Lab. Co., Ltd. |
| MP-3 | Cu powder ca. 5 μm | Cu (5 μm) | |
| MP-4 | Cu powder ca. 1 μm | Cu (1 μm) | |
| MP-5 | SUS304 powder 150 μm pass | SUS304 (under 150 μm mesh) | |
| MP-6 | In powder 45 μm pass | In (45 μm) | |
| MP-7 | Mn powder 45 μm pass | Mn (45 μm) | |
| MP-8 | Mn fine powder 10 μm | Mn (10 μm) | |
| MP-9 | Zinc Flake GTT | Zn flake (D50 = 13 μm, under 45 μm mesh) | ECKART GmbH |
| MP-10 | #350 | Sn flake | Fukuda Metal Foil & Powder Co., Ltd. |
| MP-11 | Ni_Flake Type HCA-1 | Ni filament, flake | Nikko Rica Corporation |
| MP-12 | Al powder ca. 30 μm | Al amorphous particles | Kojundo Chemical Lab. Co., Ltd. |
| MP-13 | Fe powder 53 μm pass | Fe flake approximation (under 53 μm mesh) | |
| MP-14 | Fe powder 3 μm~5 μm | Fe spherical shape (3 μm to 5 μm) | |
| MP-15 | Ti powder 45 μm pass | Ti amorphous mass (under 45 μm mesh) | |
| MP-16 | V powder 75 μm pass | V amorphous mass (under 75 μm mesh) | |
| MP-17 | Ag powder ca. 1 μm | Ag spike-like amorphose (1 μm) | |
| MP-20 | M31 (Ag 1 μm to 3 μm) | Ag spike-like amorphose (1 μm to 3 μm) | |
| MP-21 | Al powder ca. 3 μm | Al amorphous particles | |
| MP-22 | Co fine powder ca. 5 μm | Co filament shape (5 μm) | |
| MP-23 | Zn powder 75 μm pass | Zn spherical shape (under 75 μm mesh) | |
| MP-24 | Zn powder ca. 7 μm | Zn amorphous particles (7 μm) | |
| MP-25 | Ni_10 μm | Ni filament flake (10 μm) | |

TABLE 4

| | Organic solvent | Organic chelate compound | Metal particles | Evaluation result | Outline |
|---|---|---|---|---|---|
| Example 1-1 | OS-3 | OTC-1 | MP-1 | D | Comparative Example |
| Example 1-2 | | OTC-2 | | E | Comparative Example |
| Example 1-3 | | OTC-3 | | D | Comparative Example |
| Example 1-4 | | OTC-4 | | D | Comparative Example |
| Example 1-5 | | OTC-5 | | D | Comparative Example |
| Example 1-6 | | OTC-6 | | D | Comparative Example |
| Example 1-7 | | OTC-7 | | A | Example of the present invention |

TABLE 4-continued

| | Organic solvent | Organic chelate compound | Metal particles | Evaluation result | Outline |
|---|---|---|---|---|---|
| Example 1-8 | | OTC-8 | | D | Comparative Example |
| Example 1-9 | | OTC-9 | | D | Comparative Example |
| Example 1-10 | | OTC-10 | | A | Example of the present invention |
| Example 1-11 | | OTC-11 | | D | Comparative Example |
| Example 1-12 | | OTC-12 | | E | Comparative Example |
| Example 1-13 | OS-1 | OTC-7 | | E | Comparative Example |
| Example 1-14 | | OTC-10 | | E | Comparative Example |
| Example 1-15 | OS-2 | OTC-7 | | E | Comparative Example |
| Example 1-16 | | OTC-10 | | E | Comparative Example |
| Example 1-17 | OS-4 | OTC-7 | | A | Example of the present invention |
| Example 1-18 | | OTC-10 | | B | Example of the present invention |

The obtained metal-particle dispersion composition was put into a sample bottle (capacity: 14 ml) that can be fitted and sealed with a lid, and stirred in a sealed state for 1 minute under a room temperature environment. After stirring, the sample was left and evaluated according to the following evaluation criteria. The evaluation results are shown in Table 4.

A: Generation of a gas was not visually observed even when 7 days had passed from when it was left.

B: Generation of a gas was visually observed within 7 days after 5 days had passed from when it was left.

C: Generation of a gas was visually observed within 5 days after 4 days had passed from when it was left.

D: Generation of a gas was visually observed within 4 days from when it was left.

E: Turbidity was observed in a solution part when it was left, and the organic titanate compound was not appropriately dissolved.

As shown in Table 4, in a metal-particle dispersion composition according to Example 1-7 containing OTC-7 and a metal-particle dispersion composition according to Example 1-10 containing OTC-10, which were an organic titanate compound having a chelating substituent based on triethanolamine, when an organic solvent composed of alcohols having 6 or less carbon atoms having a higher boiling point than water was used, the organic titanate compound was appropriately dissolved, and even if 5 days or longer had passed from when it was left after stirring, generation of a gas was not observed. Here, in Table 1, in the metal-particle dispersion composition determined as "A", even if 200 days or longer had passed from when it was left after stirring, generation of a gas was not observed. Both a metal-particle dispersion composition according to Example 1-7 and a metal-particle dispersion composition according to Example 1-10 had a pH of 8, and zinc, which was a base material of metal particles, easily formed a hydroxide (Zn(OH)$_2$) at that pH, and thus it is thought that hydrogen was unlikely to be generated even if stirring was performed.

Here, while the pH of a metal-particle dispersion composition according to Example 1-8 containing an organic titanate compound of OTC-8 was 8.5, since the organic titanate compound of OTC-8 had a NH$_2$ group at the terminal of the chelating substituent, the solubility in the solvent was relatively low, and there was a possibility of an appropriate protective film not being formed on metal particles. In addition, while the pH of a metal-particle dispersion composition according to Example 1-5 containing an organic titanate compound of OTC-5 was 7.5, the organic titanate compound of OTC-5 was a compound having no alkoxy group and having a hydroxyl group. Therefore, it was not possible to exhibit appropriate solubility in a solvent related to a hydrolysis condensation reaction rate, and there was a possibility of an appropriate protective film not being formed on metal particles Example 2

A metal-particle dispersion composition containing 3 g of water, 2 g of any organic solvent shown in Table 1, 3 g of any metal particles shown in Table 3, and any organic titanate compound shown in Table 2 in an amount corresponding to 2 wt % of metal particles was prepared (Table 5). In addition, a metal-particle dispersion composition having the same composition but containing no organic titanate compound was prepared (Table 5).

TABLE 5

| | Organic solvent | Organic chelate compound | Metal particles | Evaluation result | Outline |
|---|---|---|---|---|---|
| Example 2-1 | OS-3 | Not contained | MP-2 | D | Comparative Example |
| Example 2-2 | | OTC-7 | | S | Example of the present invention |
| Example 2-3 | | Not contained | MP-3 | D | Comparative Example |
| Example 2-4 | | OTC-7 | | S | Example of the present invention |
| Example 2-5 | | Not contained | MP-4 | E | Comparative Example |
| Example 2-6 | | OTC-7 | | C | Example of the present invention |
| Example 2-7 | | Not contained | MP-5 | S | Reference Example |
| Example 2-8 | | OTC-7 | | S | Example of the present invention |
| Example 2-9 | | Not contained | MP-6 | D | Comparative Example |
| Example 2-10 | | OTC-7 | | S | Example of the present invention |
| Example 2-11 | | Not contained | MP-7 | D | Comparative Example |
| Example 2-12 | | OTC-7 | | B | Example of the present invention |
| Example 2-13 | | Not contained | MP-8 | D | Comparative Example |
| Exampl 2-14 | | OTC-7 | | B | Example of the present invention |
| Example 2-15 | | Not contained | MP-9 | E | Comparative Example |
| Example 2-16 | | OTC-7 | | S | Example of the present invention |
| Example 2-17 | | Not contained | MP-10 | D | Comparative Example |

TABLE 5-continued

| | Organic solvent | Organic chelate compound | Metal particles | Evaluation result | Outline |
|---|---|---|---|---|---|
| Example 2-18 | | OTC-7 | | S | Example of the present invention |
| Example 2-19 | | Not contained | MP-11 | D | Comparative Example |
| Example 2-20 | | OTC-7 | | S | Example of the present invention |
| Example 2-21 | | Not contained | MP-12 | D | Comparative Example |
| Example 2-22 | | OTC-7 | | A | Example of the present invention |
| Example 2-23 | | Not contained | MP-13 | S | Reference Example |
| Example 2-24 | | OTC-7 | | S | Example of the present invention |
| Example 2-25 | | Not contained | MP-14 | D | Comparative Example |
| Example 2-26 | | OTC-7 | | S | Example of the present invention |
| Example 2-27 | | Not contained | MP-15 | D | Comparative Example |
| Example 2-28 | | OTC-7 | | S | Example of the present invention |
| Example 2-29 | | Not contained | MP-16 | E | Comparative Example |
| Example 2-30 | | OTC-7 | | E | Reference Example |
| Example 2-31 | | Not contained | MP-17 | E | Comparative Example |
| Example 2-32 | | OTC-7 | | C | Example of the present invention |

The obtained metal-particle dispersion composition was put into a sample bottle (capacity: 14 ml) that can be fitted and sealed with a lid, and stirred in a sealed state for 1 minute under a room temperature environment. After stirring, the sample was left and evaluated according to the following evaluation criteria. The evaluation results are shown in Table 5.

S: Generation of a gas was not visually observed even when 60 days had passed from when it was left.

A: Generation of a gas was not visually observed even when 7 days had passed from when it was left.

B: Generation of a gas was visually observed within 7 days after 5 days had passed from when it was left.

C: Generation of a gas was visually observed within 5 days after 4 days had passed from when it was left.

D: Generation of a gas was visually observed within 4 days from when it was left.

E: Generation of a gas was observed during stirring.

As shown in Table 5, when OTC-7 as an organic titanate compound having a chelating substituent based on triethanolamine was contained, it was possible to significantly reduce a possibility of generating a gas. Here, when metal particles had a non-conductor forming ability (MP-5), even if OTC-7 was not contained (Example 2-7), there was a possibility of generation of a gas being minimized. In addition, when metal particles were iron particles having a relatively large particle size (MP-13), since a specific surface area of metal particles was relatively small, an area of a new surface generated in the metal-particle dispersion composition due to stirring was relatively small, and even if no OTC-7 was contained (Example 2-23), there was a possibility of generating a gas being minimized. When the base material of metal particles was V (MP-16), if the pH of the metal-particle dispersion composition was 8, $V_2O_4$, an incomplete oxide of V, was formed together with partially protonated vanadate ions ($H_2VO_4^-$). Therefore, it is thought that gas generation easily occurred. When the base material of metal particles was Ag (MP-17), if OTC-7 was not contained (Example 2-31), a gas was generated from the metal-particle dispersion composition during stirring. Since the pH of the metal-particle dispersion composition was 8, no metal was dissolved based on a general potential-pH diagram, but a large specific surface area may have had an effect because the particle size (median diameter D50) was as small as about 1 μm. Even in a state in which the solubility of metal particles increased in this manner, when OTC-7 was contained, it was possible to appropriately minimize generation of a gas from the metal-particle dispersion composition.

Example 3

A metal-particle dispersion composition containing 3 g of water, 2 g of any organic solvent shown in Table 1, 3 g of any metal particles shown in Table 3, and any organic titanate compound shown in Table 2 in an amount corresponding to 2 wt % of metal particles was prepared (Table 6). In addition, a metal-particle dispersion composition having the same composition but containing no organic titanate compound was prepared (Table 6).

TABLE 6

| | Organic solvent | Organic chelate compound | Metal particles | Evaluation result | Outline |
|---|---|---|---|---|---|
| Example 3-1 | OS-5 | Not contained | MP-9 | D | Comparative Example |
| Example 3-2 | | OTC-7 | | S | Example of the present invention |
| Example 3-3 | OS-6 | Not contained | | D | Comparative Example |
| Example 3-4 | | OTC-7 | | C | Example of the present invention |
| Example 3-5 | OS-7 | Not contained | | D | Comparative Example |
| Example 3-6 | | OTC-7 | | S | Example of the present invention |
| Example 3-7 | OS-8 | Not contained | | D | Reference Example |
| Example 3-8 | | OTC-7 | | S | Example of the present invention |
| Example 3-9 | OS-9 | Not contained | | D | Comparative Example |
| Example 3-10 | | OTC-7 | | S | Example of the present invention |
| Example 3-11 | OS-10 | Not contained | | D | Comparative Example |
| Example 3-12 | | OTC-7 | | S | Example of the present invention |
| Example 3-13 | OS-11 | Not contained | | D | Comparative Example |
| Example 3-14 | | OTC-7 | | D | Comparative Example |
| Example 3-15 | OS-12 | Not contained | | D | Comparative Example |

TABLE 6-continued

| | Organic solvent | Organic chelate compound | Metal particles | Evaluation result | Outline |
|---|---|---|---|---|---|
| Example 3-16 | | OTC-7 | | B | Example of the present invention |

The obtained metal-particle dispersion composition was put into a sample bottle (capacity: 14 ml) that can be fitted and sealed with a lid, and stirred in a sealed state for 1 minute under a room temperature environment. After stirring, the sample was left and evaluated according to the following evaluation criteria. The evaluation results are shown in Table 6.

S: Generation of a gas was not visually observed even when 60 days had passed from when it was left.
A: Generation of a gas was not visually observed even when 7 days had passed from when it was left.
B: Generation of a gas was visually observed within 7 days after 5 days had passed from when it was left.
C: Generation of a gas was visually observed within 5 days after 4 days had passed from when it was left.
D: Generation of a gas was visually observed within 4 days from when it was left.
E: Generation of a gas was observed during stirring.

Example 4

The following phosphoric acid organic titanate compound was prepared.
"Plenact 38S" (commercially available from Ajinomoto Fine-Techno Co., Inc.)
Isopropoxy tri(dioctyl pyrophosphate)titanate
Reactive group: $(H_3C)_2CH$—O—
Functional group: —O—P(=O)(OH)—O—(=O)$(OC_8H_{17})_2$
Composition active component: 90 wt % or more
2-propanol: 5 to 10 wt %
Toluene: 1.9 wt %
"Plenact 138S" (commercially available from Ajinomoto Fine-Techno Co., Inc.)
Bis(dioctyl pyrophosphate)oxyacetate titanate
Reactive group: O=C(CH$_2$O—)O—
Functional group: —O—P(=O)(OH)—O—(=O)$(OC_8H_{17})_2$
Composition active component: 90 wt % or more
2-propanol: 5 to 10 wt %
Toluene: 1.9 wt %
"Plenact 238S" (commercially available from Ajinomoto Fine-Techno Co., Inc.)
Bis(dioctyl pyrophosphate)ethylene titanate
Reactive group: $(CH_2O—)_2$
Functional group: —O—P(—O)(OH)—O—(=O)$(OC_8H_{17})_2$
Composition active component: 80 to 90 wt %
2-propanol: 10 to 20 wt %
Toluene: 1.4 wt %
"Plenact 338X" (commercially available from Ajinomoto Fine-Techno Co., Inc.)
isopropyl tri(dioctyl pyrophosphate) titanate
Reactive group: $CH_3(CH_3)(H)C$—
Functional group: —O—P(=O)(OH)—O—(=O)$(OC_8H_{17})_2$
Composition active component: 80 to 90 wt %
2-propanol: 10 to 20 wt %
Toluene: 1.5 wt %
Solvents shown in Table 7 were prepared.

TABLE 7

| Product name | Manufacturer | Structure | Structural formula |
|---|---|---|---|
| Hisolve EDE | TOHO Chemical Industry Co., Ltd. | Diethylene glycol ethyl methyl ether | C2H5O (CH2CH2O)2C2H5 |
| Hisolve MPM | TOHO Chemical Industry Co., Ltd. | Polyethylene glycol dimethyl ether | C2H5O (CH2CH2O)nC2H5 |
| Hisolve MTEM | TOHO Chemical Industry Co., Ltd. | Tetraethylene glycol dimethyl ether | CH3O (CH2CH2O)4CH3 |
| Ethyl lactate | TOHO Chemical Industry Co., Ltd. | Ethyl lactate | CH3CH (OH)COOC2H5 |
| PrG | AGC Inc. | Propylene glycol | HOCH2CH (OH)CH3 |
| DPrG | AGC Inc. | Dipropylene glycol | [CH3CH (OH)CH2]2O |
| Dowanol PM | Dow Chemcial Co., Ltd. | Propylene glycol monomethyl ether | CH3OC3H6OH |
| Dowanol DPM | Dow Chemcial Co., Ltd. | DiPropylene glycol monomethyl ether | CH3O (C3H6O)2H |
| Dowanol PnB | Dow Chemcial Co., Ltd. | Propylene glycol n-butyl ether | C4H9OC3H6OH |
| Dowanol PMA | Dow Chemcial Co., Ltd. | Propylene glycol monomethyl ether acetate | CH3OC3H6OCOCH3 |
| Dowanol TPM | Dow Chemcial Co., Ltd. | Tripropylene glycol methyl ether | CH3O (C3H6O)3H |

TABLE 7-continued

| Product name | Manufacturer | Structure | Structural formula |
|---|---|---|---|
| Dowanol DPnB | Dow Chemcial Co., Ltd. | DiPropylene glycol n-butyl ether | C4H9O (C3H6O)2H |
| Dowanol PPh | Dow Chemcial Co., Ltd. | Propylene glycol phenyl ether | C6H5OC3H6OH |
| Carbitol LG | Dow Chemcial Co., Ltd. | Diethylene glycol monoethyl ether | CH3CH2O (CH2CH2O)2H |

0.2 g of "Plenact 38S" was added to 2 g of any organic solvent shown in Table 7, and properties were observed. The results are shown in Table 8.

TABLE 8

| Product name | Manufacturer | Structure | Collection amount | Product name | Manufacturer | Structure | Amount added |
|---|---|---|---|---|---|---|---|
| Hisolve EDE | TOHO Chemical Industry Co., Ltd. | Diethylene glycol ethyl methyl ether | 2 g | Plenact 38S | Ajinomoto Fine-Techno | isopropoxy tri (dioctyl pyrophosphate ester) | 0.2 g |
| Hisolve MPM | TOHO Chemical Industry Co., Ltd. | Polyethylene glycol dimethyl ether | 2 g | | | | |
| Hisolve MTEM | TOHO Chemical Industry Co., Ltd. | Tetraethylene glycol dimethyl ether | 2 g | | | | |
| Ethyl lactate | TOHO Chemical Industry Co., Ltd. | Ethyl lactate | 2 g | | | | |
| PrG | AGC Inc. | Propylene glycol | 2 g | | | | |
| DPrG | AGC Inc. | Dipropylene glycol | 2 g | | | | |
| Dowanol PM | Dow Chemcial Co., Ltd. | Propylene glycol monomethyl ether | 2 g | | | | |
| Dowanol DPM | Dow Chemcial Co., Ltd. | DiPropylene glycol monomethyl ether | 2 g | | | | |
| Dowanol PnB | Dow Chemcial Co., Ltd. | Propylene glycol n-butyl ether | 2 g | | | | |
| Dowanol PMA | Dow Chemcial Co., Ltd. | Propylene glycol monomethyl ether acetate | 2 g | | | | |
| Dowanol TPM | Dow Chemcial Co.. Ltd. | Tripropylene glycol methyl ether | 2 g | | | | |
| Dowanol DPnB | Dow Chemcial Co., Ltd. | DiPropylene glycol n-butyl ether | 2 g | | | | |
| Dowanol PPh | Dow Chemcial Co., Ltd. | Propylene glycol phenyl ether | 2 g | | | | |
| Carbitol LG | Dow Chemcial Co., Ltd. | Diethylene glycol monoethyl ether | 2 g | | | | |

| Product name | Immediately after addition | After 3 hr | After 1 day | After 2 days | After 4 days | After 7 days | After 18 days |
|---|---|---|---|---|---|---|---|
| Hisolve EDE | ○ (known) | ← | ← | ← | ← | ← | ← |
| Hisolve MPM | ○ (known) | ← | ← | ← | ← | ← | ← |

TABLE 8-continued

| | | | | | | | |
|---|---|---|---|---|---|---|---|
| Hisolve MTEM | ○ (known) | ← | ← | ← | ← | ← | ← |
| Ethyl lactate | ○ orange | ← | ← | ← | ← | ← | ← |
| PrG | x (known) | ← | ← | ← | ← | ← | ← |
| DPrG | x (known) | ← | ← | ← | ← | ← | ← |
| Dowanol PM | ○ orange | ← | ← | ← | ← | ← | ← |
| Dowanol DPM | ○ yellow | ← | ← | ← | ← | ← | ← |
| Dowanol PnB | ○ | ← | ← | ← | ← | ← | ← |
| Dowanol PMA | ○ | ← | ← | ← | ← | ← | ← |
| Dowanol TPM | ○ | ← | ← | ← | ← | ← | ← |
| Dowanol DPnB | ○ | ← | ← | ← | ← | ← | ← |
| Dowanol PPh | ○ | ← | ← | ← | ← | ← | ← |
| Carbitol LG | ○ | ← | ← | ← | ← | ← | ← |

0.2 g of "Plenact 138S" was added to 2 g of any organic solvent shown in Table 7, and properties were observed. The results are shown in Table 9.

TABLE 9

| Product name | Manufacturer | Structure | Collection amount | Product name | Manufacturer | Structure | Amount added |
|---|---|---|---|---|---|---|---|
| Hisolve EDE | TOHO Chemical Industry Co., Ltd. | Diethylene glycol ethyl methyl ether | 2 g | Plenact 238S | Ajinomoto Fine-Techno | Bis(dioctyl pyrophosphate ester)glycol titanate | 0.2 g |
| Hisolve MPM | TOHO Chemical Industry Co., Ltd. | Polyethylene glycol dimethyl ether | 2 g | | | | |
| Hisolve MTEM | TOHO Chemical Industry Co., Ltd. | Tetraethylene glycol dimethyl ether | 2 g | | | | |
| Ethyl lactate | TOHO Chemical Industry Co., Ltd. | Ethyl lactate | 2 g | | | | |
| PrG | AGC Inc. | Propylene glycol | 2 g | | | | |
| DPrG | AGC Inc. | Dipropylene glycol | 2 g | | | | |
| Dowanol PM | Dow Chemcial Co., Ltd. | Propylene glycol monomethyl ether | 2 g | | | | |
| Dowanol DPM | Dow Chemcial Co., Ltd. | DiPropylene glycol monomethyl ether | 2 g | | | | |
| Dowanol PnB | Dow Chemcial Co., Ltd. | Propylene glycol n-butyl ether | 2 g | | | | |
| Dowanol PMA | Dow Chemcial Co., Ltd. | Propylene glycol monomethyl ether acetate | 2 g | | | | |
| Dowanol TPM | Dow Chemcial Co., Ltd. | Tripropylene glycol methyl ether | 2 g | | | | |
| Dowanol DPnB | Dow Chemcial Co., Ltd. | DiPropylene glycol n-butyl ether | 2 g | | | | |

TABLE 9-continued

| | | | |
|---|---|---|---|
| Dowanol PPh | Dow Chemcial Co., Ltd. | Propylene glycol phenyl ether | 2 g |
| Carbitol LG | Dow Chemcial Co., Ltd. | Diethylene glycol monoethyl ether | 2 g |

| | Product name | Immediately after addition | After 3 hr | After 1 day | After 2 days | After 4 days | After 7 days | After 18 days |
|---|---|---|---|---|---|---|---|---|
| | Hisolve EDE | ○ (known) | ← | ← | ← | ← | ← | ← |
| | Hisolve MPM | ○ (known) | ← | ← | ← | ← | ← | ← |
| | Hisolve MTEM | ○ (known) | ← | ← | ← | ← | ← | ← |
| | Ethyl lactate | ?orange/ muddy | ○ yellow/ clear | ← | ← | ← | ← | ← |
| | PrG | x (known) | ← | ← | ← | ← | ← | ← |
| | DPrG | x (known) | ← | ← | ← | ← | ← | ← |
| | Dowanol PM | ○orange | ← | ← | ← | ← | ← | ← |
| | Dowanol DPM | ○yellow | ← | ← | ← | ← | ← | ← |
| | Dowanol PnB | ○ | ← | ← | ← | ← | ← | ← |
| | Dowanol PMA | ○ | ← | ← | ← | ← | ← | ← |
| | Dowanol TPM | ○ | ← | ← | ← | ← | light yellow | light yellow |
| | Dowanol DPnB | ○ | ← | ← | ← | ← | ← | ← |
| | Dowanol PPh | ○ | ← | ← | ← | ← | ← | ← |
| | Carbitol LG | ○ | ← | ← | ← | ← | light yellow | light yellow |

0.2 g of "Plenact 238S" was added to 2 g of any organic solvent shown in Table 7, and properties were observed. The results are shown in Table 10.

TABLE 10

| Product name | Manufacturer | Structure | Collection amount | Product name | Manufacturer | Structure | Amount added |
|---|---|---|---|---|---|---|---|
| Hisolve EDE | TOHO Chemical Industry Co., Ltd. | Diethylene glycol ethyl methyl ether | 2 g | Plenact 238S | Ajinomoto Fine-Techno | Bis(dioctyl pyrophosphate ester)glycol titanate | 0.2 g |
| Hisolve MPM | TOHO Chemical Industry Co., Ltd. | Polyethylene glycol dimethyl ether | 2 g | | | | |
| Hisolve MTEM | TOHO Chemical Industry Co., Ltd. | Tetraethylene glycol dimethyl ether | 2 g | | | | |
| Ethyl lactate | TOHO Chemical Industry Co., Ltd. | Ethyl lactate | 2 g | | | | |
| PrG | AGC Inc. | Propylene glycol | 2 g | | | | |
| DPrG | AGC Inc. | Dipropylene glycol | 2 g | | | | |
| Dowanol PM | Dow Chemcial Co., Ltd. | Propylene glycol monomethyl ether | 2 g | | | | |
| Dowanol DPM | Dow Chemcial Co., Ltd. | DiPropylene glycol monomethyl ether | 2 g | | | | |

TABLE 10-continued

| Product name | Manufacturer | Structure | Collection amount |
|---|---|---|---|
| Dowanol PnB | Dow Chemcial Co., Ltd. | Propylene glycol n-butyl ether | 2 g |
| Dowanol PMA | Dow Chemcial Co., Ltd. | Propylene glycol monomethyl ether acetate | 2 g |
| Dowanol TPM | Dow Chemcial Co., Ltd. | Tripropylene glycol methyl ether | 2 g |
| Dowanol DPnB | Dow Chemcial Co., Ltd. | DiPropylene glycol n-butyl ether | 2 g |
| Dowanol PPh | Dow Chemcial Co., Ltd. | Propylene glycol phenyl ether | 2 g |
| Carbitol LG | Dow Chemcial Co., Ltd. | Diethylene glycol monoethyl ether | 2 g |

| Product name | Immediately after addition | After 3 hr | After 1 day | After 2 days | After 4 days | After 7 days | After 18 days |
|---|---|---|---|---|---|---|---|
| Hisolve EDE | ○ | ← | ← | ← | ← | ← | ← |
| Hisolve MPM | ○ | ← | ← | ← | ← | ← | ← |
| Hisolve MTEM | ○ | ← | ← | ← | ← | ← | ← |
| Ethyl lactate | ○ orange | ← | ← | ← | ← | ← | ← |
| PrG | turbid | gelation x | ← | ← | ← | ← | ← |
| DPrG | turbid | gelation x | ← | ← | ← | ← | ← |
| Dowanol PM | ○ orange | ← | ← | ← | ← | ← | ← |
| Dowanol DPM | ○ yellow | ← | ← | ← | ← | ← | ← |
| Dowanol PnB | ○ | ← | ← | ← | ← | ← | ← |
| Dowanol PMA | ○ | ← | ← | ← | ← | ← | ← |
| Dowanol TPM | ○ | ← | ← | ← | ← | light yellow | light yellow |
| Dowanol DPnB | ○ | ← | ← | ← | ← | ← | ← |
| Dowanol PPh | ○ | ← | ← | ← | ← | ← | ← |
| Carbitol LG | ○ | ← | ← | ← | ← | light yellow | light yellow |

0.2 g of "Plenact 338X" was added to 2 g of any organic solvent shown in Table 7, and properties were observed. The results are shown in Table 11.

TABLE 11

| Product name | Manufacturer | Structure | Collection amount | Product name | Manufacturer | Structure | Amount added |
|---|---|---|---|---|---|---|---|
| Hisolve EDE | TOHO Chemical Industry Co, Ltd. | Diethylene glycol ethyl methyl ether | 2 g | Plenact 338X | Ajinomoto Fine-Techno | Bis(dioctyl pyrophosphate ester) glycol titanate | 0.2 g |
| Hisolve MPM | TOHO Chemical Industry Co, Ltd. | Polyethylene glycol dimethyl ether | 2 g | | | | |
| Hisolve MTEM | TOHO Chemical Industry Co, Ltd. | Tetraethylene glycol dimethyl ether | 2 g | | | | |
| Ethyl lactate | TOHO Chemical Industry Co, Ltd. | Ethyl lactate | 2 g | | | | |

TABLE 11-continued

| | | | |
|---|---|---|---|
| PrG | AGC Inc. | Propylene glycol | 2 g |
| DPrG | AGC Inc. | Dipropylene glycol | 2 g |
| Dowanol PM | Dow Chemcial Co, Ltd. | Propylene glycol monomethyl ether | 2 g |
| Dowanol DPM | Dow Chemcial Co., Ltd. | DiPropylene glycol monomethyl ether | 2 g |
| Dowanol PnB | Dow Chemcial Co., Ltd. | Propylene glycol n-butyl ether | 2 g |
| Dowanol PMA | Dow Chemcial Co., Ltd. | Propylene glycol monomethyl ether acetate | 2 g |
| Dowanol TPM | Dow Chemcial Co., Ltd. | Tripropylene glycol methyl ether | 2 g |
| Dowanol DPnB | Dow Chemcial Co., Ltd. | DiPropylene glycol n-butyl ether | 2 g |
| Dowanol PPh | Dow Chemcial Co., Ltd. | Propylene glycol phenyl ether | 2 g |
| Carbitol LG | Dow Chemcial Co., Ltd. | Diethylene glycol monoethyl ether | 2 g |

| Product name | Immediately after addition | After 3 hr | After 1 day | After 2 days | After 4 days | After 7 days | After 18 days |
|---|---|---|---|---|---|---|---|
| Hisolve EDE | ○ | ← | ← | ← | ← | ← | ← |
| Hisolve MPM | ○ | ← | ← | ← | ← | ← | ← |
| Hisolve MTEM | ○ | ← | ← | ← | ← | ← | ← |
| Ethyl lactate | ○ orange | ← | ← | ← | ← | ← | ← |
| PrG | turbid | gelation x | ← | ← | ← | ← | ← |
| DPrG | turbid | gelation x | ← | ← | ← | ← | ← |
| Dowanol PM | ○ orange | ← | ← | ← | ← | ← | ← |
| Dowanol DPM | ○ yellow | ← | ← | ← | ← | ← | ← |
| Dowanol PnB | ○ | ← | ← | ← | ← | ← | ← |
| Dowanol PMA | ○ | ← | ← | ← | ← | ← | ← |
| Dowanol TPM | ○ | ← | ← | ← | ← | ← | ← |
| Dowanol DPnB | ○ | ← | ← | ← | ← | ← | ← |
| Dowanol PPh | ○ | ← | ← | ← | ← | ← | ← |
| Carbitol LG | ○ | ← | ← | ← | ← | ← | ← |

0.2 g of a substance represented as "OTC-7" in Table 2 was added to 2 g of any organic solvent shown in Table 7, and properties were observed. The results are shown in Table 12.

TABLE 12

| Product name | Manufacturer | Structure | Collection amount | Product name | Manufacturer | Structure | Amount added |
|---|---|---|---|---|---|---|---|
| Hisolve EDE | TOHO Chemical Industry Co., Ltd. | Diethylene glycol ethyl methyl ether | 2 g | Orgatix TC400 | Matsumoto Fine Chemical Co., Ltd. | diisoproxy titanium bis(triethanol aminate) | 0.2 g |

TABLE 12-continued

| | | | |
|---|---|---|---|
| Hisolve MPM | TOHO Chemical Industry Co., Ltd. | Polyethylene glycol dimethyl ether | 2 g |
| Hisolve MTEM | TOHO Chemical Industry Co., Ltd. | Tetraethylene glycol dimethyl ether | 2 g |
| Ethyl lactate | TOHO Chemical Industry Co., Ltd. | Ethyl lactate | 2 g |
| PrG | AGC Inc. | Propylene glycol | 2 g |
| DPrG | AGC Inc. | Dipropylene glycol | 2 g |
| Dowanol PM | Dow Chemcial Co., Ltd. | Propylene glycol monomethyl ether | 2 g |
| Dowanol DPM | Dow Chemcial Co., Ltd. | DiPropylene glycol monomethyl ether | 2 g |
| Dowanol PnB | Dow Chemcial Co., Ltd. | Propylene glycol n-butyl ether | 2 g |
| Dowanol PMA | Dow Chemcial Co., Ltd. | Propylene glycol monomethyl ether acetate | 2 g |
| Dowanol TPM | Dow Chemcial Co., Ltd. | Tripropylene glycol methyl ether | 2 g |
| Dowanol DPnB | Dow Chemcial Co., Ltd. | DiPropylene glycol n-butyl ether | 2 g |
| Dowanol PPh | Dow Chemcial Co, Ltd. | Propylene glycol phenyl ether | 2 g |
| Carbitol LG | Dow Chemcial Co, Ltd. | Diethylene glycol monoethyl ether | 2 g |

| Product name | Immediately after addition | After 3 hr | After 1 day | After 2 days | After 4 days | After 7 days | After 18 days |
|---|---|---|---|---|---|---|---|
| Hisolve EDE | X (known) | ← | ← | ← | ← | ← | ← |
| Hisolve MPM | X (known) | ← | ← | ← | ← | ← | ← |
| Hisolve MTEM | X (known) | ← | ← | ← | ← | ← | ← |
| Ethyl lactate | ? yellow/turbid | ? yellow/turbid | ? yellow/turbid | x yellow/turbid | ← | ← | ← |
| PrG | ○ (known) | ← | ← | ← | ← | ← | ← |
| DPrG | ○ (known) | ← | ← | ← | ← | ← | ← |
| Dowanol PM | ? yellow/turbid | ○ yellow/clear | ← | ← | ← | ← | ← |
| Dowanol DPM | ? yellow/turbid | ○ yellow/clear | ← | ← | ← | ← | ← |
| Dowanol PnB | ○ | ← | ← | ← | ← | ← | ← |
| Dowanol PMA | ? turbid | ? turbid | ? turbid | x turbid | ← | ← | ← |
| Dowanol TPM | ○ | ← | ← | ← | ← | light yellow | light yellow |
| Dowanol DPnB | ○ | ← | ← | ← | ← | ← | ← |
| Dowanol PPh | ○ | ← | ← | ← | ← | ← | ← |
| Carbitol LG | ○ | ← | ← | ← | ← | light yellow | light yellow |

Example 5

A metal-particle dispersion composition containing 3 g of water, 2 g of any organic solvent shown in Table 7, 1 g of any of the above phosphoric acid organic titanate compounds, and 3 g of metal particles represented as "MP-1" in Table 3 was prepared. The metal-particle dispersion composition obtained in this manner was put into a sample bottle (capacity: 14 ml) that can be fitted and sealed with a lid, and stirred in a sealed state for 1 minute under a room temperature environment. After stirring, the sample was left and observed on a daily basis and stability was evaluated. The evaluation results are shown in Table 13 to Table 15 respectively illustrated in FIGS. 1-3. In Table 13 to Table 15, a result with a numerical value indicated as "finished" means that decrease in stability was confirmed after storage for the number of days indicated by the number, and evaluation was completed. On the other hand, the expression "ongoing" means that no decrease in stability was observed even after storage for the number of days (34 days, 35 days) shown in Table 13 to Table 15.

Example 6

A metal-particle dispersion composition containing 3 g of water, 2 g of Hisolve MTEM shown in Table 7, 3 g of any metal particle shown in Table 3, and 0.2 g of Plenact 38S or Plenact 238S was prepared (Table 16 to Table 19). In addition, a metal-particle dispersion composition having the same composition but containing none of Plenact 38S and Plenact 238S was prepared (Table 16 to Table 19).

TABLE 16

| Organic solvent | Organic chelate compound | Metal particles | Evaluation result | Confirmation date |
|---|---|---|---|---|
| OS-2 | Not contained | MP-20 | Generated | 1 |
| | Plenact 38S | | Generated | 1 |
| | Not contained | MP-17 | Generated | 1 |
| | Plenact 38S | | Generated | 4 |
| | Not contained | MP-12 | Generated | 2 |
| | Plenact 38S | | Not generated | 21 |
| | Not contained | MP-21 | Generated | 4 |
| | Plenact 38S | | Generated | 8 |
| | Not contained | MP-22 | Generated | 0.5 |
| | Plenact 38S | | Not generated | 21 |
| | Not contained | MP-2 | Generated | 0.5 |
| | Plenact 38S | | Generated | 1 |
| | Not contained | MP-3 | Generated | 0.5 |
| | Plenact 38S | | Not generated | 21 |
| | Not contained | MP-4 | Generated | 0.5 |
| | Plenact 38S | | Not generated | 22 |
| | Not contained | MP-13 | Generated | 11 |
| | Plenact 38S | | Not generated | 21 |
| | Not contained | MP-14 | Generated | 2 |
| | Plenact 38S | | Not generated | 21 |
| | Not contained | MP-5 | Generated | 11 |
| | Plenact 38S | | Not generated | 21 |

TABLE 17

| Organic solvent | Organic chelate compound | Metal particles | Evaluation result | Confirmation date |
|---|---|---|---|---|
| OS-2 | Not contained | MP-6 | Generated | 1 |
| | Plenact 38S | | Not generated | 21 |
| | Not contained | MP-7 | Generated | 0.5 |
| | Plenact 38S | | Generated | 6 |
| | Not contained | MP-8 | Generated | 11 |
| | Plenact 38S | | Generated | 4 |
| | Not contained | MP-16 | Generated | 0 |
| | Plenact 38S | | Not generated | 5 |
| | Not contained | MP-23 | Generated | 0.5 |
| | Plenact 38S | | Generated | 5 |
| | Not contained | MP-9 | Generated | 0 |
| | Plenact 38S | | Not generated | 34 |
| | Not contained | MP-24 | Generated | 4 |
| | Plenact 38S | | Not generated | 21 |
| | Not contained | MP-25 | Generated | 2 |
| | Plenact 38S | | Not generated | 21 |
| | Not contained | MP-10 | Generated | 3 |
| | Plenact 38S | | Not generated | 21 |
| | Not contained | MP-15 | Generated | 3 |
| | Plenact 38S | | Not generated | 21 |

TABLE 18

| Organic solvent | Organic chelate compound | Metal particles | Evaluation result | Confirmation date |
|---|---|---|---|---|
| OS-2 | Not contained | MP-17 | Generated | 1 |
| | Plenact 238S | | Generated | 4 |
| | Not contained | MP-12 | Generated | 2 |
| | Plenact 238S | | Not generated | 21 |
| | Not contained | MP-21 | Generated | 4 |
| | Plenact 238S | | Not generated | 21 |
| | Not contained | MP-22 | Generated | 0.5 |
| | Plenact 238S | | Not generated | 21 |
| | Not contained | MP-2 | Generated | 0.5 |
| | Plenact 238S | | Generated | 4 |
| | Not contained | MP-3 | Generated | 0.5 |
| | Plenact 238S | | Not generated | 21 |
| | Not contained | MP-4 | Generated | 0.5 |
| | Plenact 238S | | Not generated | 21 |
| | Not contained | MP-13 | Generated | 11 |
| | Plenact 238S | | Not generated | 21 |
| | Not contained | MP-14 | Generated | 2 |
| | Plenact 238S | | Not generated | 21 |
| | Not contained | MP-5 | Generated | 11 |
| | Plenact 238S | | Not generated | 21 |

TABLE 19

| Organic solvent | Organic chelate compound | Metal particles | Evaluation result | Confirmation date |
|---|---|---|---|---|
| OS-2 | Not contained | MP-6 | Generated | 1 |
| | Plenact 238S | | Not generated | 21 |
| | Not contained | MP-7 | Generated | 0.5 |
| | Plenact 238S | | Generated | 6 |
| | Not contained | MP-8 | Generated | 11 |
| | Plenact 238S | | Not generated | 21 |
| | Not contained | MP-16 | Generated | 0 |
| | Plenact 238S | | Generated | 0 |
| | Not contained | MP-23 | Generated | 0.5 |
| | Plenact 238S | | Generated | 11 |
| | Not contained | MP-9 | Generated | 0 |
| | Plenact 238S | | Generated | 19 |
| | Not contained | MP-24 | Generated | 4 |
| | Plenact 238S | | Not generated | 21 |
| | Not contained | MP-25 | Generated | 2 |
| | Plenact 238S | | Not generated | 21 |
| | Not contained | MP-10 | Generated | 3 |
| | Plenact 238S | | Not generated | 21 |
| | Not contained | MP-15 | Generated | 3 |
| | Plenact 238S | | Not generated | 21 |

The obtained metal-particle dispersion composition was put into a sample bottle (capacity: 14 ml) that can be fitted and sealed with a lid, and stirred in a sealed state for 1 minute under a room temperature environment. After stirring, the sample was left, and it was checked whether generation of a gas was visually observed. When generation of a gas was confirmed, the column of the evaluation result in Table 16 to Table 19 was set as "generated," and the column of confirmation date was set as "0." After 12 hours from when it was left, it was visually checked whether generation of a gas was observed. When generation of a gas was confirmed, the column of the evaluation result in Table 16 to Table 19 was set as "generated," and the column of confirmation date was set as "0.5." Thereafter, generation of a gas was visually checked once a day, and when generation of a gas was confirmed, the column of the evaluation result in Table 16 to Table 19 was set as "generated," and the number of days since it was first left until generation of a gas was confirmed is shown in the column of confirmation date. When no generation of a gas was confirmed even after a predetermined number of days had passed, the column of the evaluation result in Table 16 to Table 19 was set as "not generated," and the column of confirmation date indicates the number of days since it was first left before the final confirmation date.

Table 20 shows the calculation results of the solubility from the solubility product of various metal elements.

TABLE 20

| Type of element | Assumed phosphate Structure | Mw | Solubility product (Chemical Handbook Revised 2nd Edition) mol/L | Calculated solubility g/L |
|---|---|---|---|---|
| Ag | $Ag_3PO_4$ | 418.58 | 1.30E−20 | 4.77E−08 |
| Al | $AlPO_4$ | 121.95 | 3.90E−11 | 7.62E−04 |
| Co | $Co_3(PO_4)$ | 366.73 | 1.80E−35 | 1.56E−15 |
| Cr | $CrPO_4 \cdot 4H_2O$ | 218.97 | 2.40E−23 | 1.07E−09 |
| Cu | $Cu_3(PO_4)_2$ | 380.59 | 1.30E−37 | 1.37E−16 |
| Fe | $FePO_4$ | 150.82 | 1.30E−22 | 1.72E−09 |
|  | $Fe_3(PO_4)28H_2O$ | 501.6 | — | — |
| SUS304 | — | — | — | — |
| In | $InPO_4$ | 209.79 | 2.20E−22 | 3.11E−09 |
| Mn | $MnPO_4 \cdot H_2O$ | 167.9 | — | — |
| V | $V_3(PO_4)_5$ | 627.7 | — | — |
| Zn | $Zn_3(PO_4)_2$ | 386.08 | 9.10E−33 | 3.68E−14 |
|  | $Zn_3(PO_4)_2 \cdot 4H_2O$ | 458.2 | — | — |
| Ni | $Ni_3(PO_4)_2$ | 366.01 | 5.30E−31 | 2.66E−13 |
|  | $Ni_3(PO_4)_2 \cdot 8H_2O$ | 510.1 | — | — |
| Sn | $SnHPO_4$ | 214.7 | — | — |
| Ti | $Ti_3(PO_4)_4$ | 523.5 | — | — |

In addition, Table 21 shows literature data related to the solubility.

TABLE 21

| Type of element | Assumed phosphate Structure | Mw | Determination of solubility (Chemical Handbook Revised 5th Edition) |
|---|---|---|---|
| Ag | $Ag_3PO_4$ | 418.58 | Poorly soluble |
| Al | $AlPO_4$ | 121.95 | Insoluble |
| Co | $Co_3(PO_4)$ | 366.73 | Insoluble |
| Cr | $CrPO_4 \cdot 4H_2O$ | 218.97 | Insoluble |
| Cu | $Cu_3(PO_4)_2$ | 380.59 | Insoluble |
| Fe | $FePO_4$ | 150.82 | Poorly soluble |
|  | $Fe_3(PO_4)28H_2O$ | 501.6 | Insoluble |
| SUS304 | — | — | — |
| In | $InPO_4$ | 209.79 | — |
| Mn | $MnPO_4 \cdot H_2O$ | 167.9 | Insoluble |
| V | $V_3(PO_4)_5$ | 627.7 | — |
| Zn | $Zn_3(PO_4)_2$ | 386.08 | — |
|  | $Zn_3(PO_4)_2 \cdot 4H_2O$ | 458.2 | Insoluble |
| Ni | $Ni_3(PO_4)_2$ | 366.01 | — |
|  | $Ni_3(PO_4)_2 \cdot 8H_2O$ | 510.1 | Insoluble |
| Sn | $SnHPO_4$ | 214.7 | Insoluble |
| Ti | $Ti_3(PO_4)_4$ | 523.5 | — |

The invention claimed is:

1. A metal-particle dispersion composition containing, based on the entire composition, 10 to 80 mass % of metal particles, 0.01 to 10 mass % of an organic titanate compound, 1 to 40 mass % of water, and 2 to 30 mass % of an organic solvent having a higher boiling point than water, wherein the organic titanate compound consists of at least one compound selected from the group consisting of isopropoxy tri(dioctyl pyrophosphate)titanate, bis(dioctyl pyrophosphate)oxyacetate titanate, bis(dioctyl pyrophosphate)ethylene titanate, and isopropyl tri(dioctyl pyrophosphate) titanate, and wherein the organic solvent having a higher boiling point than water has 7 to 20 carbon atoms and has a plurality of ether bonds.

2. The metal-particle dispersion composition according to claim 1, wherein the number of ether bonds contained in the organic solvent having a higher boiling point than water is 3 or more.

3. The metal-particle dispersion composition according to claim 1, wherein the organic solvent having a higher boiling point than water contains a smaller number of hydroxyl groups than the number of ether bonds.

\* \* \* \* \*